March 30, 1926.
L. M. PERKINS
GENERATOR
Filed April 18, 1922
1,578,914
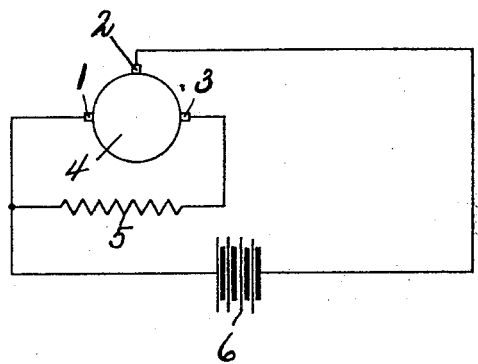

Patented Mar. 30, 1926.

1,578,914

UNITED STATES PATENT OFFICE.

LAURENCE M. PERKINS, OF SYRACUSE, NEW YORK, ASSIGNOR OF ONE-HALF TO OWEN-DYNETO CORPORATION, OF SYRACUSE, NEW YORK, A CORPORATION OF NEW YORK.

GENERATOR.

Application filed April 18, 1922. Serial No. 555,335.

*To all whom it may concern:*

Be it known that I, LAURENCE M. PERKINS, a citizen of the United States of America, of Syracuse, in the county of Onondaga, in the State of New York, have invented new and useful Improvements in Generators, of which the following, taken in connection with the accompanying drawings, is a full, clear, and exact description.

This invention relates to certain improvements in generators, with special regard to third brush constant potential generators, and contemplates certain improvements on the generator shown and described in my co-pending application Serial No. 418,181, to which this application is closely related.

The main object of this invention is to increase the efficiency, commutation and characteristics of the third brush generator.

Other objects and advantages will appear from the following description, taken in connection with the accompanying drawings, in which:—

The figure diagrammatically illustrates a generator of my invention.

As shown in the said figure, the generator comprises an armature —4— provided with main brushes —1— and —2— and a third brush —3—. The main brush —1— is set practically on neutral while the main brush —2— is off its neutral point in the direction of rotation to such an extent that the angle between the two brushes is less than 180 electrical degrees, and altho shown as approximately 90 electrical degrees from the brush —1—, yet the brush —2— may be in any position in the field form so that the angle between the two main brushes is less than 180 electrical degrees.

The angular disposition of the brush —2— is determined somewhat by the generator design and the desired output. The third brush —3— is placed at or near the other neutral point opposite the main brush —1—.

It will be noted that the brush —2— in this construction of machine may be placed in such a position in the field form that the field density at that point is relatively low instead of being placed in the position of maximum field density, as is the case with this main brush in the normal third brush machine.

The generator further comprises a field winding connected in shunt across the main brush —1— and the third brush —3—.

This construction as distinguished from that of my co-pending application referred to is efficient and desirable in case a very strong armature field is used, sufficient drop of voltage being effected at high speeds by the negative flux acting on the conductors between the main brush on neutral and the third brush on substantially the other neutral point to cut down the field strength.

The main brushes —1— and —2— are connected in circuit across the battery 6 or other external source of E. M. F.

Altho I have shown and described a specific construction as illustrative of an embodiment of my invention, I do not desire to limit myself to the details of form, construction or arrangement of the same, as various changes may be made without departing from the invention as set forth in the claims appended.

I claim:

1. The combination with a variable speed generator having a brush substantially on neutral, a brush off its neutral to such an extent that the angle between the two brushes is less than 180 electrical degrees, and an external source of E. M. F. connected to said brushes, of a third brush substantially on the other neutral point, and a shunt field connected across the brushes on the neutral points.

2. The combination with a variable speed generator having a brush substantially on neutral, a brush off its neutral to such an extent that the angle between the two brushes is less than 180 electrical degrees, and an external source of E. M. F. connected to said brushes, of a third brush, and a shunt field connected across the first and last mentioned brushes.

3. The combination with a variable speed generator having a brush substantially on neutral, a brush off its neutral at a point of relatively low field density, and an external source of E. M. F. connected to said brushes, of a third brush substantially on the other neutral point, and a shunt field connected across the two brushes on the neutral points.

In witness whereof I have hereunto set my hand this 15th day of April, 1922.

LAURENCE M. PERKINS.